March 21, 1961 R. E. TIBBETTS ET AL 2,975,674
CONVERTIBLE DUAL CONJUGATE LENS
Filed Dec. 29, 1959 2 Sheets-Sheet 1

Fig. 7

| EF = 76.3 mm. | | | | f/1.9 |
|---|---|---|---|---|
| Lens | $N_D$ | V | Radii, mm. | Thicknesses, mm. |
| 1 | 1.6200 | 60.3 | $R_1 = +\ 49.51$ | $T_1 = 7.1$ |
|   |        |      | $R_2 = +1838.0$  | $S_1 = 2.7$ |
| 2 | 1.6200 | 60.3 | $R_3 = +\ 25.6$  | $T_2 = 8.2$ |
| 3 | 1.5956 | 39.7 | $R_4 = \infty$   | $T_3 = 2.5$ |
|   |        |      | $R_5 = +\ 17.65$ | $S_2 = 13.0$ |
| 4 | 1.5795 | 41.0 | $R_6 = -\ 22.15$ | $T_4 = 2.5$ |
| 5 | 1.6200 | 60.3 | $R_7 = +\ 86.11$ | $T_5 = 9.6$ |
|   |        |      | $R_8 = -\ 31.75$ | $S_3 = 6.3$ |
| 6 | 1.6110 | 58.8 | $R_9 = +1400.0$  | $T_6 = 7.5$ |
|   |        |      | $R_{10} = -\ 62.0$ |  |

Object distance 127.7 mm.    Image distance 104.4 mm.
Magnification 0.9x.

Fig. 8

| EF = 76.3 mm. | | | | f/1.9 |
|---|---|---|---|---|
| Lens | $N_D$ | V | Radii, mm. | Thicknesses, mm. |
| 1 | 1.6110 | 58.8 | $R_1 = +\ 48.25$ | $T_1 = 6.8$ |
|   |        |      | $R_2 = +\ 603.8$ | $S_1 = 0.9$ |
| 2 | 1.6200 | 60.3 | $R_3 = +\ 26.0$  | $T_2 = 7.9$ |
| 3 | 1.5956 | 39.7 | $R_4 = +\ 550.0$ | $T_3 = 2.5$ |
|   |        |      | $R_5 = +\ 18.25$ | $S_2 = 13.0$ |

Elements 4, 5, and 6 same as in above Fig. 7.

Object distance 196.1 mm.    Image distance 78.2 mm.
Magnification 0.5x.

United States Patent Office 2,975,674
Patented Mar. 21, 1961

2,975,674

CONVERTIBLE DUAL CONJUGATE LENS

Raymond E. Tibbetts and David C. Gilkeson, Rochester, N.Y., assignors, by mesne assignments, to Revere Camera Company, a corporation of Delaware Filed Dec. 29, 1959, Ser. No. 862,576

4 Claims. (Cl. 88—57)

This invention relates to a convertible dual conjugate lens; that is, a dual conjugate lens having a plurality of elements, some but not all of which may be replaced or interchanged in order to have the lens work at a different magnification.

An object of the invention is the provision of a generally improved and more satisfactory lens of this character.

Another object is the provision of a convertible lens which, upon replacing part of the elements, can work at a different finite magnification without loss of image quality or introduction of distortion.

Still another object is the provision of a dual conjugate lens which, by replacing part of the elements of the lens, can be made to work at a plurality of different finite magnifications, of the order, for example, of 0.9× and 0.5×.

These and other desirable objects may be attained in the manner disclosed as an illustrative embodiment of the invention in the following description and in the accompanying drawings forming a part hereof, in which:

Fig. 7 is a table of numerical data with respect to the lens of Fig. 1; and

Fig. 8 is a table of numerical data with respect to the lens of Fig. 4.

The present invention concerns a convertible lens which can be converted, by replacement of certain elements, to work at different finite magnification such as 0.9× and 0.5×, without substantial loss of image quality or introduction of substantial distortion. The conversion, according to the present invention, is made by changing only that half of the lens elements which face the long conjugate. The equivalent focal length remains the same, notwithstanding the replacement of elements.

Figures 2, 3:
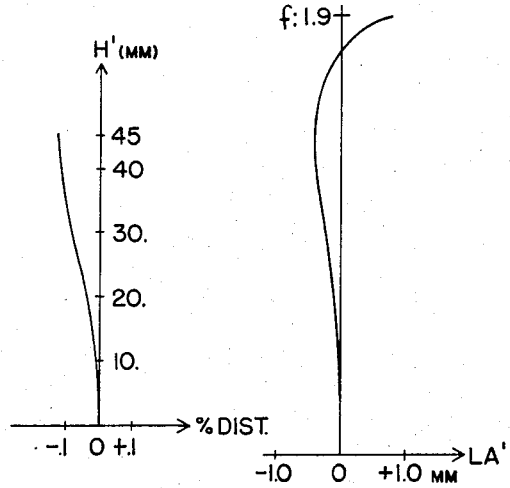
Fig. 2 is a graph showing percentage of distortion of this lens, plotted against height of the ray at the focal plane.
Fig. 3 is a graph showing the spherical aberration of this lens.
Figures 5, 6:
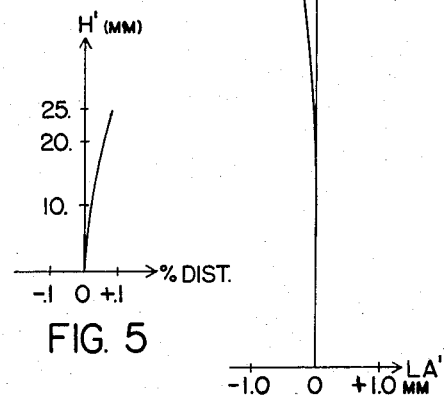
Fig. 5 is a view similar to Fig. 2, with relation to the lens of Fig. 4.
Fig. 6 is a graph similar to Fig. 3 with respect to the lens of Fig. 4.

Normally, when such a significant change of magnification from 0.9 to 0.5 is made in a lens corrected spherically for its object and image points, the distortion changes with object distance. In the lens of the present invention, however, there are very low residuals of distortion at either magnification. Compare Fig. 2, showing the percentage of distortion when the lens works at magnification of 0.9, with Fig. 5, which shows the percentage of distortion when the lens works at magnification of 0.5. It will be seen that in both cases the percentage of distortion is quite small, and well within acceptable limits. It will also be seen by comparing Fig. 3 with Fig. 6, that the spherical aberration does not change significantly when the lens is converted, and in both cases is well within acceptable limits.

In the following disclosure, the individual lens elements are numbered consecutively from 1 to 6, from front to rear. Elements 2 and 3 are cemented to each other, as are elements 4 and 5. All other elements are air spaced. In converting the lens from one magnification to the other, only elements 1, 2, and 3 are replaced, the other elements 4, 5, and 6 remaining unchanged.

The radii of curvature R, the axial thicknesses T of the lens elements, and the spacings S between elements, are all expressed in the customary manner, with the usual subscripts indicating the particular surface, lens thickness, or air space, numbered in sequence from front to rear. Since elements 2 and 3 are cemented together, $R_4$ refers to both the rear surface of lens element 2 and the front surface of line element 3. The same is true of $R_7$ with respect to the lens elements 4 and 5. The plus and minus values of the radii R indicate surfaces respectively convex and concave toward the front, in accordance with conventional notation. The respective refractive indices, expressed in reference to the spectral D line of sodium, are indicated by N, and the dispersive indices or Abbe numbers are indicated by V. The diameters of the respective lens elements are indicated by D. In certain of the data given below, preferred ranges of the refractive indices of the various lens elements are indicated, and the particular element referred to is identified by the subscript numeral used with N, again referring to the same lens element numbers from 1 to 6 as above explained. The character F stands for the equivalent focal length of the entire lens, and as above mentioned this is the same at both magnifications.

It is found that the above mentioned objects of the invention are well fulfilled, and excellent results are obtained, when the variables of radii, thicknesses, spacings, and refractive indices are kept within the limits indicated by the algebraic inequalities in the following tables. Table 1 indicates the preferable limits of the variables for the lens when working at magnification of 0.9×, and Table 2 indicates the variables of the front three elements of the lens when working at magnification of 0.5×, the elements 4, 5, and 6 being identical in both cases so that they need not be repeated in Table 2.

TABLE 1

Preferred range of variable for lens at magnification of 0.9×

.63 $F < +R_1 < .68\ F$         .03 $F < T_3 < .04\ F$
18. $F < +R_2 < 25.\ F$          .16 $F < S_2 < .18\ F$
.32 $F < +R_3 < .35\ F$          .03 $F < T_4 < .04\ F$
48. $F < +R_4 \leqq \infty$      .12 $F < T_5 < .13\ F$
.22 $F < +R_5 < .24\ F$          .08 $F < S_3 < .09\ F$
.28 $F < -R_6 < .30\ F$          .09 $F < T_6 < .11\ F$
.98 $F < +R_7 < 1.3\ F$          $1.60 < N_1 < 1.64$
.40 $F < -R_8 < .44\ F$          $1.60 < N_2 < 1.64$
7.8 $F < +R_9 < 40.\ F$          $1.58 < N_3 < 1.62$
.77 $F < -R_{10} < .85\ F$       $1.56 < N_4 < 1.60$
.09 $F < T_1 < .10\ F$           $1.60 < N_5 < 1.64$
.03 $F < S_1 < .04\ F$           $1.59 < N_6 < 1.63$
.100 $F < T_2 < .115\ F$

TABLE 2

*Preferred range of variables for lens at magnification of 0.5×*

.62 $F<+R_1<.64\ F$     .011 $F<S_1<.013\ F$
6.2 $F<+R_2<11.8\ F$     .100 $F<T_2<.115\ F$
.33 $F<+R_3<.35\ F$     .03 $F<T_3<.04\ F$
4.6 $F+<R_4<16.\ F$     .16 $F<S_2<.18\ F$
.23 $F<+R_5<.25\ F$     $1.59<N_1<1.63$
.08 $F<T_1<.09\ F$     $1.60<N_2<1.64$
    $1.58<N_3<1.62$

Other variables same as in Table 1.

A specific example of a lens whose variables fall within the above-mentioned limits and which meets all of the outlined requirements may be constructed in accordance with the numerical data in the following Tables 3 and 4, the various symbols therein having the same meanings above explained. All dimensions in Tables 3 and 4 are given in millimeters.

TABLE 3

*Data for lens at magnification of 0.9×*

| Lens | N | V | D | Radii, mm. | Thicknesses, mm. |
|---|---|---|---|---|---|
| 1 | 1.6200 | 60.3 | 40 | $R_1 = +\ 49.51$ | $T_1 = 7.1$ |
|   |        |      |    | $R_2 = +1,838.0$ | $S_1 = 2.7$ |
| 2 | 1.6200 | 60.3 | 35 | $R_3 = +\ 25.6$ | $T_2 = 8.2$ |
|   |        |      |    | $R_4 = \infty$  |             |
| 3 | 1.5956 | 39.7 | 36 |                  | $T_3 = 2.5$ |
|   |        |      |    | $R_5 = +\ 17.65$ | $S_2 = 13.0$ |
|   |        |      |    | $R_6 = -\ 22.15$ |             |
| 4 | 1.5795 | 41.0 | 36 | $R_7 = +\ 86.11$ | $T_4 = 2.5$ |
| 5 | 1.6200 | 60.3 | 35 |                  | $T_5 = 9.6$ |
|   |        |      |    | $R_8 = -\ 31.75$ | $S_3 = 6.3$ |
|   |        |      |    | $R_9 = +1,400.00$ |            |
| 6 | 1.6110 | 58.8 | 40 |                  | $T_6 = 7.5$ |
|   |        |      |    | $R_{10} = -\ 62.0$ |           |

Equivalent focal length=76.3 mm.
Object distance=127.7 mm. Image distance=104.4 mm.
Relative aperture=$f$:1.9
Diaphragm location=6.0 mm. forwardly from vertex of front surface of lens element 4.

TABLE 4

*Data for lens magnification of 0.5×*

| Lens | N | V | D | Radii, mm. | Thicknesses, mm. |
|---|---|---|---|---|---|
| 1 | 1.6110 | 58.8 | 40 | $R_1 = +\ 48.25$ | $T_1 = 6.8$ |
|   |        |      |    | $R_2 = +603.8$   | $S_1 = 0.9$ |
| 2 | 1.6200 | 60.3 | 35 | $R_3 = +\ 26.0$  | $T_2 = 7.9$ |
|   |        |      |    | $R_4 = +550.0$   |             |
| 3 | 1.5956 | 39.7 | 36 |                  | $T_3 = 2.5$ |
|   |        |      |    | $R_5 = +\ 18.25$ | $S_2 = 13.0$ |

Lenses 4, 5, and 6 same as in foregoing table 3.
Object distance=196.1 mm. Image distance=78.2 mm.
Equivalent focal length=76.3 mm. Relative aperture=$f$:1.9
Diaphragm location same as in foregoing table 3.

Figure 1:
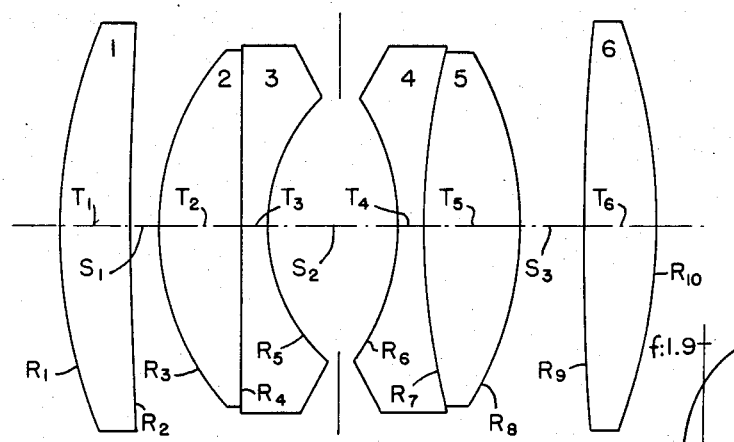
Fig. 1 is a diagrammatic view of the preferred embodiment of the present invention, utilizing the elements which give the lens a magnification of 0.9×.
Figure 4:
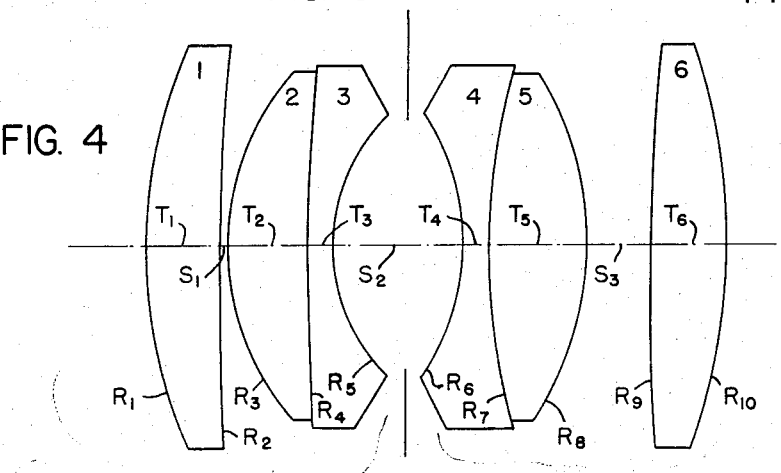
Fig. 4 is a view similar to Fig. 1 showing the lens when converted to give a magnification of 0.5×.

A lens according to the above specific example in Table 3 is shown diagrammatically in Fig. 1, and a lens according to the above specific example in Table 4 is shown diagrammatically in Fig. 4. The numerical data from Tables 3 and 4 are repeated for convenience in Figs. 7 and 8 of the drawings.

Although the data are given in two different tables it should be emphasized that we are not discussing two separate lenses, but are discussing what should really be considered as a single convertible lens capable of change from one magnification power to a different magnification power at minimum expense.

This convertible lens is capable of many uses in many locations. To mention merely one example, the lens is very useful on a special camera of the type intended for photographing the face of a cathode ray tube of an oscilloscope. In this case, the lens elements 4, 5, and 6 would preferably be permanently mounted on the camera, although capable of longitudinal movement for focusing, because the image distance from the rear vertex of the rear lens element is different when operating under conditions of 0.9× than when operating under conditions of 0.5×. The first three lens elements would preferably be mounted in a detachable and interchangeable mount, easily connectable as by means of a bayonet connection or the like, to the three rear elements mounted on the camera. In other words, the user of the camera would be supplied with the two interchangeable mounts, one containing lens elements 1, 2, and 3 according to Tables 1 and 3, the other containing lens elements 1, 2, and 3 according to Tables 2 and 4. Then one or the other of these interchangeable lens mounts would be placed on the camera, depending upon whether the user wished to photograph the face of the cathode ray tube at a magnification of 0.9× or at a magnification of 0.5×.

Variations in the dimensions given in the specific examples of Tables 3 and 4 are possible, of course, without departing from the invention, but such variations should preferably be kept within the proportional limits outlined in Tables 1 and 2.

For convenience of description, the lens elements 1, 2, and 3 collectively may be called the front group or the interchangeable group, and the lens elements 4, 5, and 6 collectively may be called the rear group or the permanent group or the common group (this group being common to the two interchangeable front groups). In each case the complete lens comprises, of course, the lens elements of the common group assembled in proper alinement and spacing with the lens elements of the selected interchangeable group.

This application is a continuation-in-part of our co-pending patent application, Serial No. 792,116, filed February 9, 1959, now abandoned.

What is claimed is:

1. A convertible photographic lens comprising a front interchangeable group of lens elements and a rear permanent group of lens elements, said lens being capable of operation at two materially different magnification powers by interchange of one front group for another front group and having substantially the same equivalent focal length regardless of which front group is used, each front group having three lens elements with the front element air spaced and the other two elements having mating surfaces cemented to each other, said rear group having three lens elements with the rear element air spaced and the other two elements having mating surfaces cemented to each other, and below-mentioned characteristics of said lens element with one front group in effective operating position being substantially within the ranges indicated by the following algebraic inequalities:

.63 $F<+R_1<.68\ F$     .03 $R<T_3<.04\ F$
18. $F<+R_2<25.\ F$     .16 $F<S_2<.18\ F$
.32 $F<+R_3<.35\ F$     .03 $F<T_4<.04\ F$
48. $F<+R_4\leq\infty$     .12 $F<T_5<.13\ F$
.22 $F<+R_5<.24\ F$     .08 $F<S_3<.09\ F$
.28 $<-R_6<.30\ F$     .09 $F<T_6<.11\ F$
.98 $F<+R_7<1.3\ F$     $1.60<N_1<1.64$
.40 $<-R_8<.44\ F$     $1.60<N_2<1.64$
7.8 $F<+R_9<40.\ F$     $1.58<N_3<1.62$
.77 $F<-R_{10}<.85\ F$     $1.56<N_4<1.60$
.09 $F<T_1<.10\ F$     $1.60<N_5<1.64$
.03 $F<S_1<.04\ F$     $1.59<N_6<1.63$
.100 $F<T_2<.115\ F$ the below-mentioned characteristics of the lens elements of the other interchangeable front group being substantially within the ranges indicated by the following algebraic inequalities:

$.62\ F<+R_1<.64\ F$  $.100\ F<T_3<.115\ F$
$6.2\ F<+R_2<11.8\ F$  $.03\ F<T_3<.04\ F$
$.33\ F<+R_3<.35\ F$  $.16\ F<S_2<.18\ F$
$4.6\ F<+R_4<16.\ F$  $1.59<N_1<1.63$
$.23\ F<+R_5<.25\ F$  $1.60<N_2<1.64$
$.08\ F<T_1<.09\ F$  $1.58<N_3<1.62$
$.011\ F<S_1<.013\ F$ wherein F is the equivalent focal length of the entire lens, R is the radius of curvature of a lens surface, the subscript numeral identifying the particular surface as numbered in order from front to rear, mating cemented surfaces being counted as a single surface in numbering them, plus and minus values of R indicating surfaces which are respectively convex and concave toward the front of the lens, T and N are respectively the axial thickness and the refractive index (for the D line of the spectrum) of the particular lens element whose number corresponds with the subscript, numbering the lens elements in order from front to rear, and S is the axial thickness of air spacing between two adjacent lens elements, the subscript thereof identifying the particular air space as numbered in order from front to rear.

2. A convertible photograph lens comprising a front interchangeable group of lens elements and a rear permanent group of lens elements, said lens being capable of operation at two materially different magnification powers by interchange of one front group for another front group and having substantially the same equivalent focal length regardless of which front group is used, each front group having three lens elements with the front element air spaced and the other two elements having mating surfaces cemented to each other, said rear group having three lens elements with the rear element air spaced and the other two elements having mating surfaces cemented to each other, the characteristics of said lens elements and their spatial relationship to each other with one front group in place being substantially in the proportions indicated by the data in the following table:

| Lens | N | V | Radii, mm. | Thicknesses, mm. |
| --- | --- | --- | --- | --- |
| 1 | 1.6200 | 60.3 | $R_1=+\ \ 49.51$ | $T_1=\ 7.1$ |
|  |  |  | $R_2=+1,838.0$ | $S_1=\ 2.7$ |
| 2 | 1.6200 | 60.3 | $R_3=+\ \ 25.6$ | $T_2=\ 8.2$ |
|  |  |  | $R_4=\infty$ |  |
| 3 | 1.5956 | 39.7 |  | $T_3=\ 2.5$ |
|  |  |  | $R_5=+\ \ 17.65$ | $S_2=13.0$ |
|  |  |  | $R_6=-\ \ 22.15$ |  |
| 4 | 1.5795 | 41.0 | $R_7=+\ \ 86.11$ | $T_4=\ 2.5$ |
| 5 | 1.6200 | 60.3 |  | $T_5=\ 9.6$ |
|  |  |  | $R_8=-\ \ 31.75$ | $S_3=\ 6.3$ |
|  |  |  | $R_9=+1,400.0$ |  |
| 6 | 1.6110 | 58.8 | $R_{10}=-\ \ 62.0$ | $T_6=\ 7.5$ | the characteristics of the lens elements of the other interchangeable front group and their spatial relationship to each other being substantially in the proportions indicated by the data in the following table:

| Lens | N | V | Radii, mm. | Thicknesses, mm. |
| --- | --- | --- | --- | --- |
| 1 | 1.6110 | 58.8 | $R_1=+\ 48.25$ | $T_1=\ 6.8$ |
|  |  |  | $R_2=+603.8$ | $S_1=\ 0.9$ |
| 2 | 1.6200 | 60.3 | $R_3=+\ 26.0$ | $T_2=\ 7.9$ |
|  |  |  | $R_4=+550.0$ |  |
| 3 | 1.5956 | 39.7 |  | $T_3=\ 2.5$ |
|  |  |  | $R_5=+\ 18.25$ | $S_2=13.0$ | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by the subscript numeral used with each R, mating cemented surfaces being counted as a single surface in numbering them, plus and minus values of R indicating surfaces which are respectively convex and concave toward the front of the lens, the axial thicknesses T of the respective lens elements and the axial thicknesses S of the air spaces between lens elements being given in the fifth column, the respective lens element thicknesses and air spaces being separately numbered from front to rear and being respectively identified by numerical subscripts used with each T and S, the quantities R, T, and S being expressed in millimeters for a lens having an equivalent focal length of substantially 76.3 millimeters and being variable in proportion for lenses having other equivalent focal lengths.

3. A photographic objective lens comprising six lens elements with the first and last elements being single air-spaced elements, the second and third elements together forming a doublet with mating cemented surfaces, the fourth and fifth elements also together forming a doublet with mating cemented surfaces, the characteristics of said lens elements and their spatial relationship to each other being substantially in the proportions indicated by the data in the following table:

| Lens | N | V | Radii, mm. | Thicknesses, mm. |
| --- | --- | --- | --- | --- |
| 1 | 1.6200 | 60.3 | $R_1=+\ \ 49.51$ | $T_1=\ 7.1$ |
|  |  |  | $R_2=+1,838.0$ | $S_1=\ 2.7$ |
| 2 | 1.6200 | 60.3 | $R_3=+\ \ 25.6$ | $T_2=\ 8.2$ |
|  |  |  | $R_4=\infty$ |  |
| 3 | 1.5956 | 39.7 |  | $T_3=\ 2.5$ |
|  |  |  | $R_5=+\ \ 17.65$ | $S_2=13.0$ |
|  |  |  | $R_6=-\ \ 22.15$ |  |
| 4 | 1.5795 | 41.0 | $R_7=+\ \ 86.11$ | $T_4=\ 2.5$ |
| 5 | 1.6200 | 60.3 |  | $T_5=\ 9.6$ |
|  |  |  | $R_8=-\ \ 31.75$ | $S_3=\ 6.3$ |
|  |  |  | $R_9=+1,400.0$ |  |
| 6 | 1.6110 | 58.8 | $R_{10}=-\ \ 62.0$ | $T_6=\ 7.5$ | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by the subscript numeral used with each R, mating cemented surfaces being counted as a single surface in numbering them, plus and minus values of R indicating surfaces which are respectively convex and concave toward the front of the lens, the axial thicknesses T of the respective lens elements and the axial thicknesses S of the air spaces between lens elements being given in the fifth column, the respective lens element thicknesses and air spaces being separately numbered from front to rear and being respectively identified by numeral subscripts used with each T and S, the quantities R, T, and S being expressed in millimeters for a lens having an equivalent focal length of substantially 76.3 millimeters and being variable proportionately for lenses having other equivalent focal lengths.

4. A photographic objective lens comprising six lens elements with the first and last elements being single air-spaced elements, the second and third elements together forming a doublet with mating cemented surfaces, the fourth and fifth elements also together forming a doublet with mating cemented surfaces, the characteristics of said lens elements and their spatial relationship to each other being substantially in the proportions indicated by the data in the following table:

| Lens | N | V | Radii, mm. | Thicknesses, mm. |
|---|---|---|---|---|
| 1 | 1.6110 | 58.8 | $R_1 = +\ 48.25$ | $T_1 = 6.8$ |
|   |        |      | $R_2 = +\ 603.8$ | $S_1 = 0.9$ |
| 2 | 1.6200 | 60.3 | $R_3 = +\ 26.0$ | $T_2 = 7.9$ |
| 3 | 1.5956 | 39.7 | $R_4 = +\ 550.0$ | $T_3 = 2.5$ |
|   |        |      | $R_5 = +\ 18.25$ | $S_2 = 13.0$ |
|   |        |      | $R_6 = -\ 22.15$ |               |
| 4 | 1.5795 | 41.0 | $R_7 = +\ 86.11$ | $T_4 = 2.5$ |
| 5 | 1.6200 | 60.3 | $R_8 = -\ 31.75$ | $T_5 = 9.6$ |
|   |        |      |                  | $S_3 = 6.3$ |
| 6 | 1.6110 | 58.8 | $R_9 = +1,400.0$ | $T_6 = 7.5$ |
|   |        |      | $R_{10} = -\ 62.0$ |             | wherein the respective lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered in order from front to rear and being respectively identified by the subscript numeral used with each R, mating cemented surfaces being counted as a single surface in numbering them, plus and minus values of R indicating surfaces which are respectively convex and concave toward the front of the lens, the axial thicknesses T of the respective lens elements and the axial thicknesses S of the air spaces between lens elements being given in the fifth column, the respective lens element thicknesses and air spaces being separately numbered from front to rear and being respectively identified by numerical subscripts used with each T and S, the quantities R, T, and S being expressed in millimeters for a lens having an equivalent focal length of substantially 76.3 millimeters and being variable proportionately for lenses having other equivalent focal lengths.

No references cited.